US007845062B2

(12) United States Patent
Vaes

(10) Patent No.: US 7,845,062 B2
(45) Date of Patent: Dec. 7, 2010

(54) METHOD OF MANUFACTURING MULTI PIECE CURVED MOLDINGS FROM PLANAR MATERIAL

(76) Inventor: Ed Vaes, 223 Avondale Street, Hamilton, ON (CA) L8L 7C4

( * ) Notice: Subject to any disclaimer, the term of this patent is extended or adjusted under 35 U.S.C. 154(b) by 887 days.

(21) Appl. No.: 11/688,400

(22) Filed: Mar. 20, 2007

(65) Prior Publication Data

US 2007/0220729 A1 Sep. 27, 2007

Related U.S. Application Data

(60) Provisional application No. 60/767,414, filed on Mar. 27, 2006.

(51) Int. Cl.
*B27M 3/00* (2006.01)
*B27M 1/08* (2006.01)
*B23P 15/00* (2006.01)
*B23P 17/00* (2006.01)

(52) U.S. Cl. ......................... 29/558; 409/131; 409/225; 83/471.3; 83/467.1; 269/47; 144/367; 144/371; 144/360

(58) Field of Classification Search .................. 29/56.5, 29/557–558, 559; 409/131–132, 205, 225, 409/219; 144/356, 360, 363, 367, 369, 371; 83/471.3, 473, 490, 467.1; 269/47
See application file for complete search history.

(56) References Cited

U.S. PATENT DOCUMENTS

| | | | | |
|---|---|---|---|---|
| 2,474,552 | A * | 6/1949 | Steinmeyer | 160/348 |
| 4,356,849 | A * | 11/1982 | Fredrickson | 409/130 |
| 4,688,612 | A * | 8/1987 | Kessel et al. | 144/367 |
| 4,801,225 | A * | 1/1989 | Morghen | 409/218 |
| RE34,994 | E * | 7/1995 | Bonyman | 83/447 |
| 5,787,948 | A * | 8/1998 | Fadyk | 144/130 |
| 6,016,854 | A * | 1/2000 | Ziegler | 144/371 |
| 6,076,574 | A * | 6/2000 | Fadyk | 144/363 |
| 6,962,180 | B2 * | 11/2005 | White | 144/360 |
| 6,964,286 | B2 * | 11/2005 | White | 144/3.1 |
| 2006/0277840 | A1 * | 12/2006 | Bailey | 52/86 |
| 2007/0234661 | A1 * | 10/2007 | Vaes | 52/287.1 |
| 2007/0288118 | A1 * | 12/2007 | Vaes | 700/160 |

* cited by examiner

*Primary Examiner*—Erica E Cadugan
(74) *Attorney, Agent, or Firm*—Jansson Shupe & Munger Ltd.

(57) ABSTRACT

Method of manufacturing multi piece curved molding from planar material including the steps of, milling locating holes in the bottom side of sheet material proximate ends of curved sections, milling curved section from sheet material including the finished outer radius, the finished inner radius and milled ends, milling the profile to produce the profiled top side on curved section, placing locating holes in corresponding locating pins in a precision cut off fixture and precision cutting ends of curved section thereby producing a precision cut end and discarding waste portion.

9 Claims, 13 Drawing Sheets

FIG. - 14
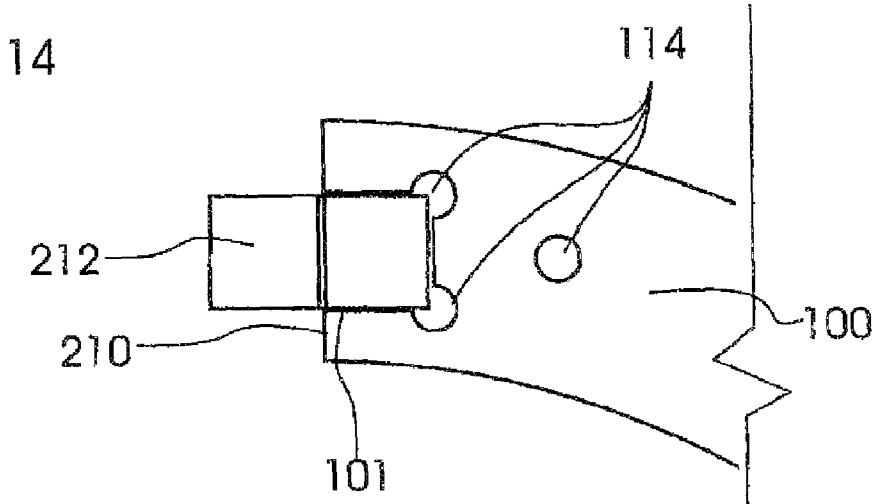
FIG. - 15
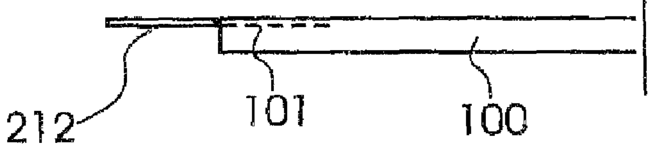
FIG. - 16
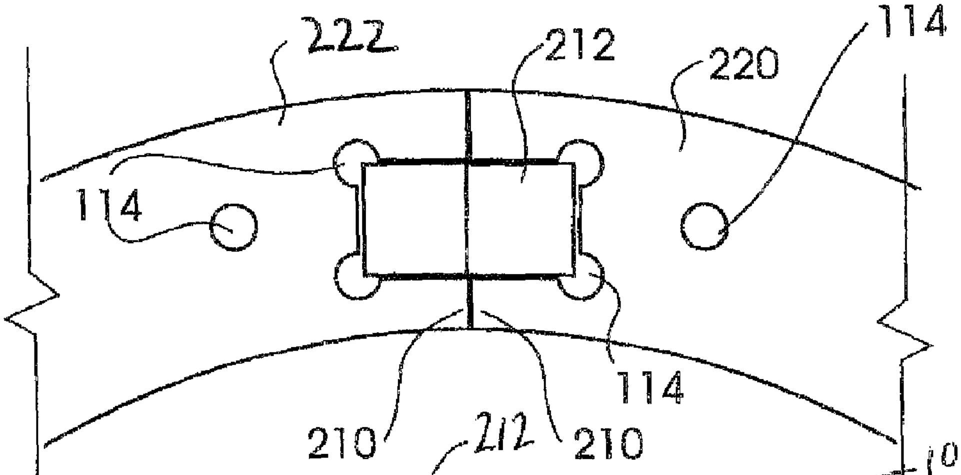
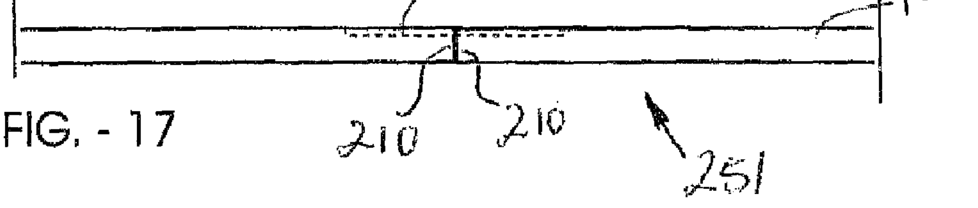
FIG. - 17

METHOD OF MANUFACTURING MULTI PIECE CURVED MOLDINGS FROM PLANAR MATERIAL

The application claims priority from previously filed U.S. provisional patent application No. 60/767,414, titled "METHOD OF MANUFACTURING MULTI PIECE CURVED MOLDINGS FROM PLANAR MATERIAL on Mar. 27, 2006 by Ed Vaes and provisional patent application No. 60/804,107 titled "METHOD OF MANUFACTURING MULTI PIECE CURVED MOLDINGS FROM PLANAR MATERIAL on Jun. 7, 2006 by Ed Vaes.

FIELD OF THE INVENTION

The present invention relates to method of manufacturing multi piece curved moldings and in particular relates to a method of manufacturing multi piece curved moldings from planar material.

BACKGROUND OF THE INVENTION

In the residential and commercial building industry, arched windows, door ways and other arched structures of buildings are normally trimmed with wood and/or other composite materials in order to finish off the surfaces. Traditionally the curved and/or arched sections are manufactured in one piece and the choice of the material depends upon the final finish desired. In the case where the final design calls for a natural wood look, namely a stained wood finish, the arched sections are normally manufactured by laminating together thin strips of wood material into curved sections by bending the thin strips into the particular curved section and gluing the thin strips together until the desired width is obtained. In the case where painted or a none natural wood finish is desirable, the arches are normally cut out of medium density fiber board (MDF) and/or other suitable materials including, but not limited to strand board, wafer board, chip board, foam and a multitude of various plastic materials.

Presently the commonality between all of the methods of manufacture is that the arches are constructed out of one piece and shipped to the job site as a one piece arched and/or curved sections.

The one piece arches presently made are very large and bulky and as a result are difficult and expensive to ship. They are also prone to breakage and in the installation processes are normally not flexible nor adjustable and therefore unforgiving in the installation.

Therefore, there is a need for producing arches and/or curved sections in multiple pieces which can be fit together at the job site thereby allowing one to be able to ship the sections in individual pieces which are then placed together on the job site to create the complete arch and/or curved section. The problem associated with producing an arch in multiple sections is the cutting of the curved sections in order that they make a smooth and perfect fit together, such that the arch and/or the curved section follows smoothly and accurately the archway which will be trimmed.

BRIEF DESCRIPTION OF THE DRAWINGS

The present invention, a method of manufacturing multi piece curved moldings from planar material will now be described by way of example only with reference to the following drawings in which:

FIG. 14 shows schematically one end of a curved section, wherein one half of a hinge is being fitted into a pocket located in the back of the curved section.

FIG. 15 is a side plan view of the curved section and hinge shown in FIG. 14.

FIG. 16 is a top plan view showing schematically two curved sections being jointed together at the precision cut end with a hinge.

FIG. 17 is a side plan view of the two curved sections show in FIG. 16.

DETAILED DESCRIPTION OF THE PREFERRED EMBODIMENT

Figure 1:
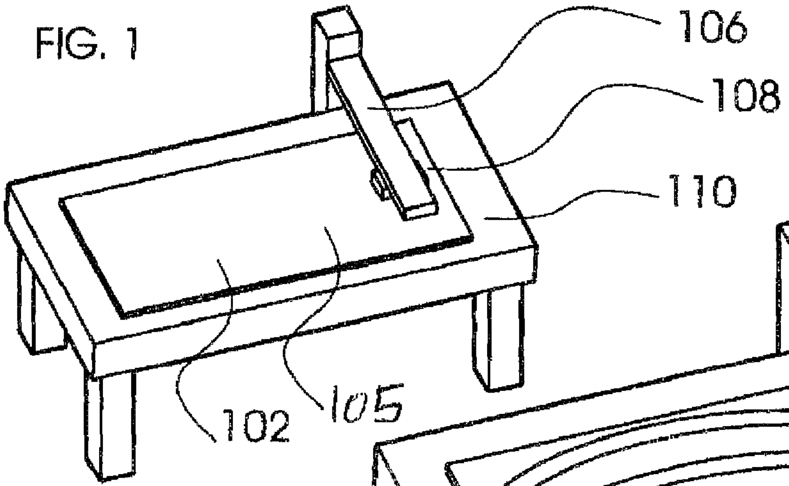
FIG. 1 is a top perspective view of a CNC table together with sheet material placed thereon.

The present invention, a method of manufacturing multi piece curved moldings from planar material is depicted in the attached diagrams.

FIGS. 1 through 6 show the initial steps taken in order to produce the curved sections. Firstly, commonly used CNC machine having a table 110 is used to cut out curved sections out of planar sheet material 102. The bottom surface 105 of the planar sheet material is shown face up and CNC arm 106 having a moveable CNC cutter 108 moves across the top portion of the table in order to cut sheet material 102 into the desired shape.

Figure 2:
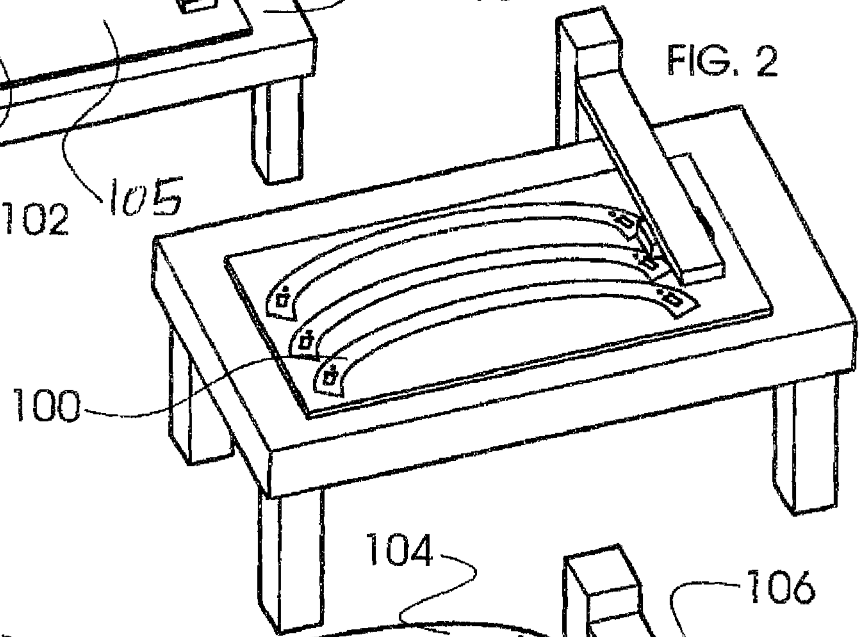
FIG. 2 is a top perspective view of the CNC table showing the curved sections being cut out of the sheet material.

FIG. 2 shows how curved sections 100 are cut out of sheet material 102. Planar sheet material 102 may be a medium density fiber board, it may be strand board, it may be wafer board or chipped board, it may be foam, it may be any combination of various plastic materials that are commercially available, or it may even be pieces of solid wood and/or plywood. In fact planar sheet material 102 may be any material which can be suitably adapted for use with the herein described process.

Figure 3:
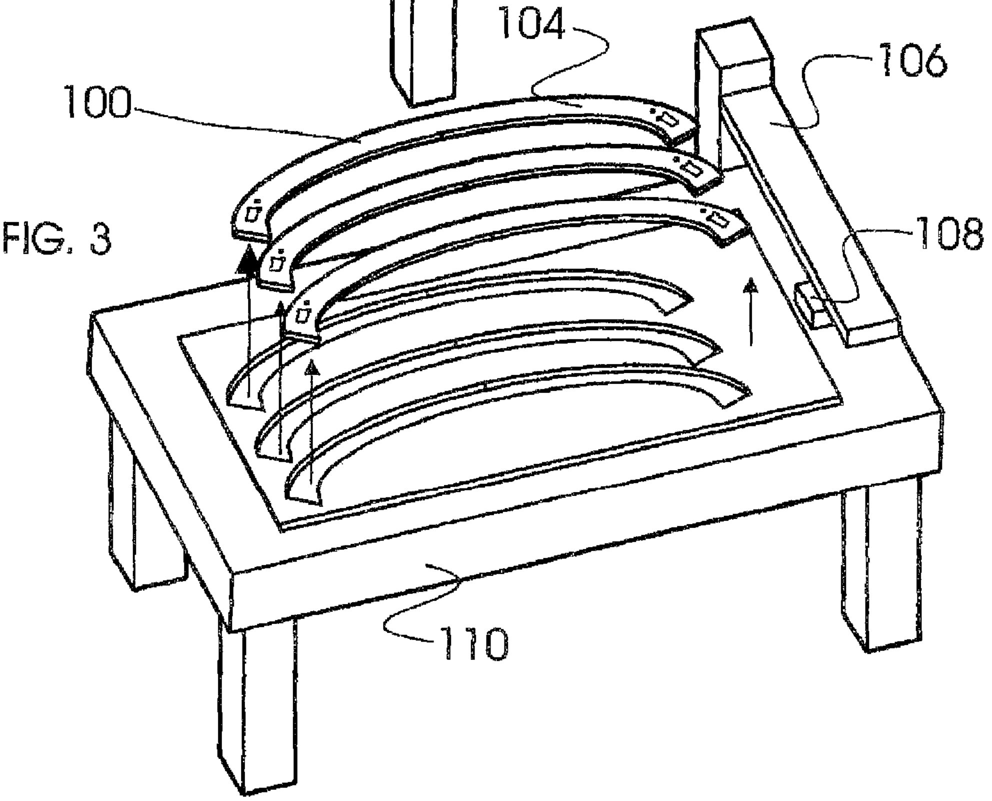
FIG. 3 is a top perspective view of the CNC table showing the curved sections being removed from the sheet material after being cut.

Once the desired curved section is machined on the CNC table from the sheet material 102, curved sections 100 are removed from table 110 as shown in FIG. 3.

Figure 4:
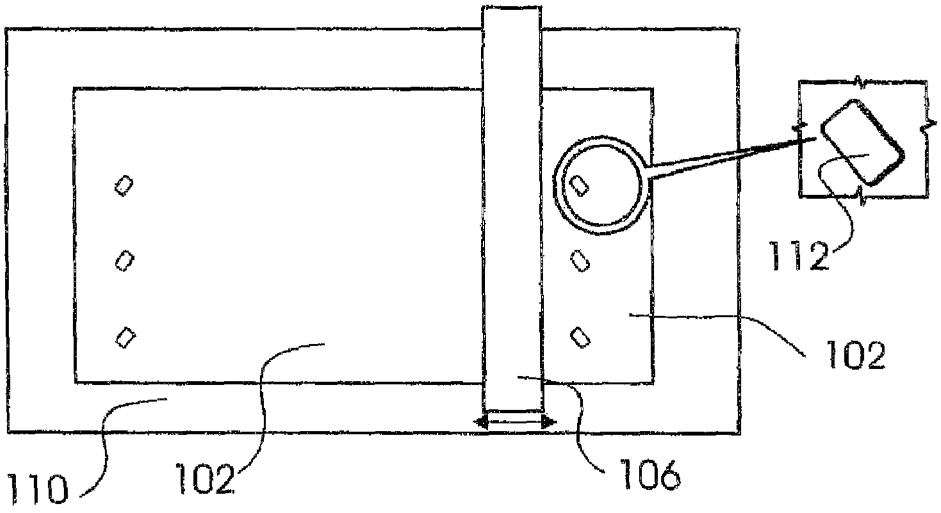
FIG. 4 is a top plan view of the CNC table wish sheet material thereon showing pockets being cut out of the strategic locations.
Figure 5:
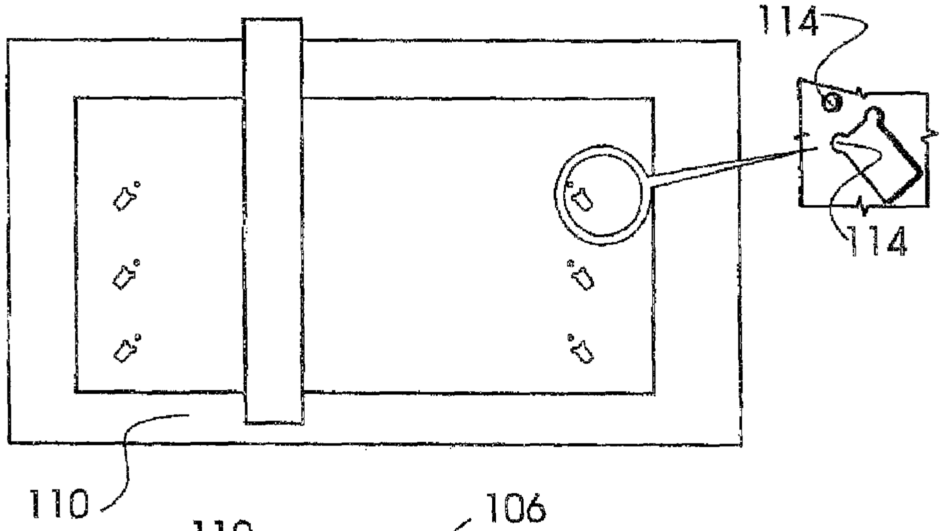
FIG. 5 shows CNC table with a sheet material thereon with locating holes being cut in strategic locations.

Shown more specifically in FIG. 4 which is a top plan view of the CNC table, the first step which is optional is the cutting of a pocket 112 out of sheet material 102 in strategic locations which ultimately end up near the end of each curved section 100.

Next a female locating feature shown in this example as locating holes 114 are machined as depicted in FIG. 5, again strategically located near the ends of curved section 100.

Figure 6:
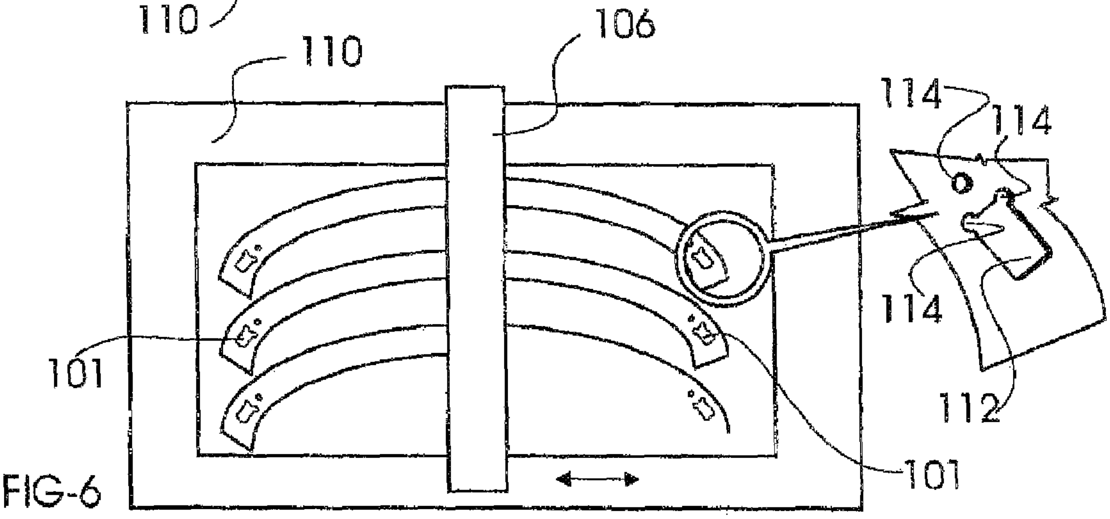
FIG. 6 is a top plan view of a CNC table with a sheet material thereon showing the curved sections cut out of the sheet material together with the locating holes defined in the back side of the material.
Figure 7:
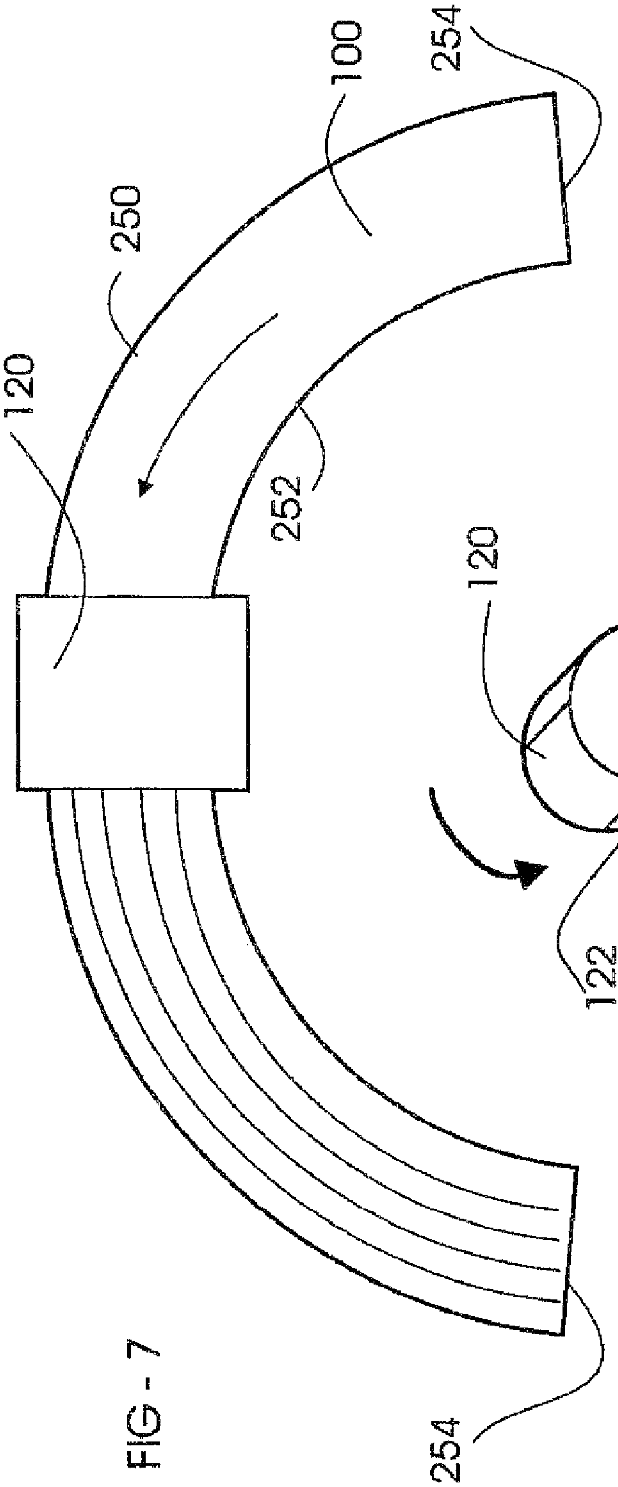
FIG. 7 is a top plan view of a curved section shown being fed through a profiling tool which cuts a profiled top side onto the curved section.
Figure 8:
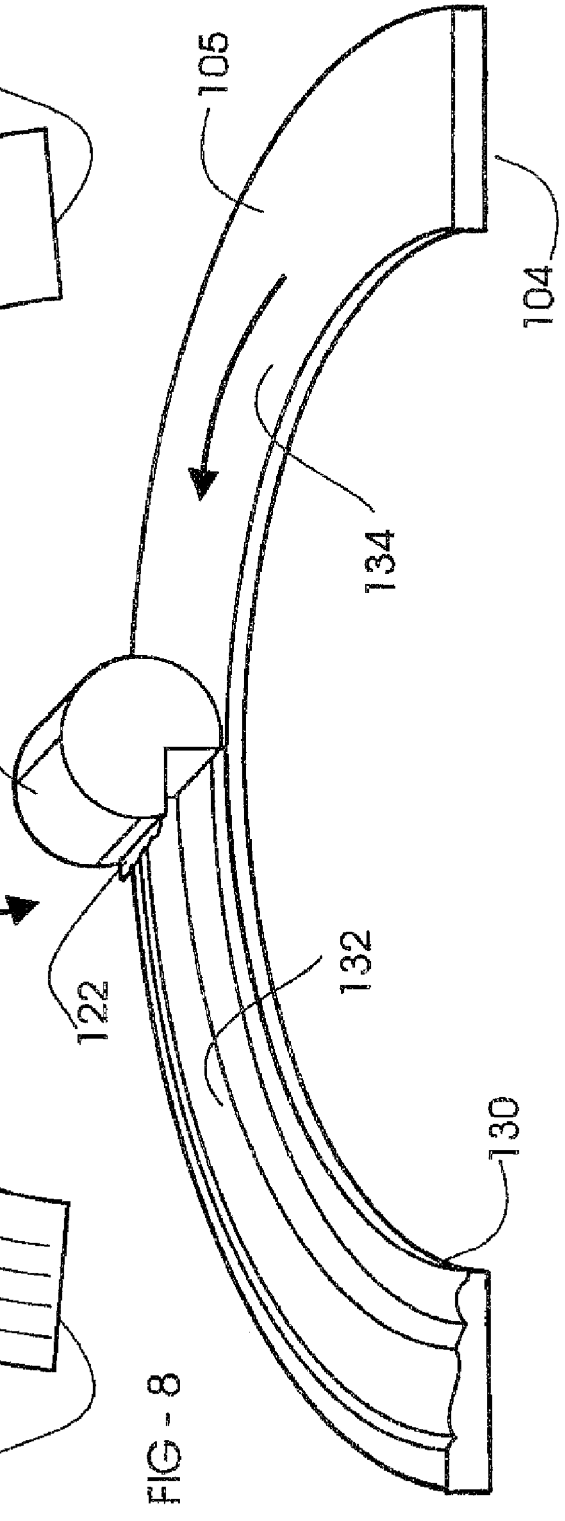
FIG. 8 is a top perspective view of a curved section showing profiling tools cutting a profiled top side into the top side of the curved section.

FIG. 6 shows how each curved section is machined out of sheet material 102, wherein each end 101 includes three locating holes 114 and optionally will also include a pocket 112. As shown in FIGS. 7 and 8, curved section 100 at this stage of the manufacturing process has a flat bottom side and flat top side and is fed through a profiling tool 120 which has a profile cutter 122 for creating a profiled top side 132 of curved section 100.

At this point each curved section 100 includes a profile top side and locating holes 114 defined in the bottom side and optionally a pocket 112 also defined in the bottom side near each end 101 of each curved section 100.

Figure 9:
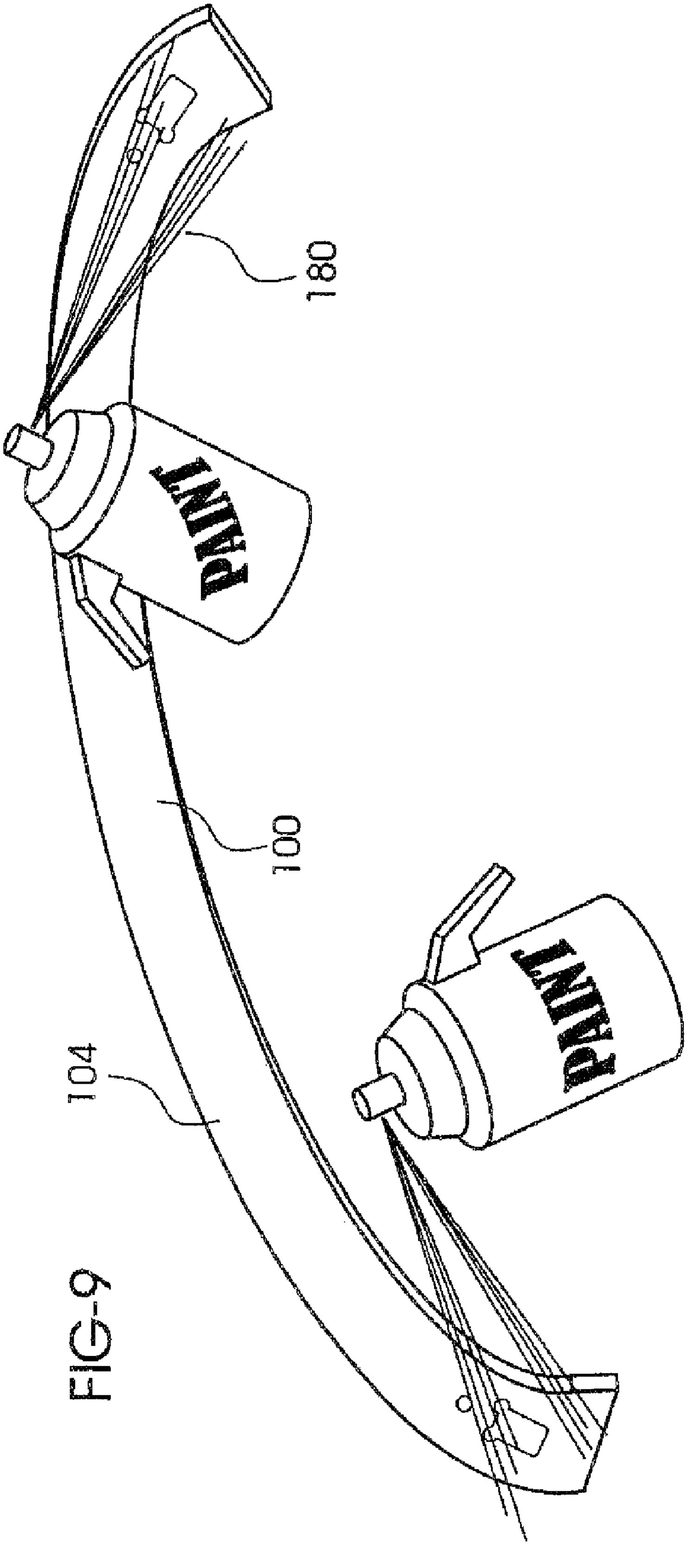
FIG. 9 shows the bottom side of the curved sections being painted in strategic locations.

FIG. 9 shows the bottom side 104 of each curved section 100 being painted with paint 180. This is an optional step which may be required for future processing of curved section 100.

Figure 10:
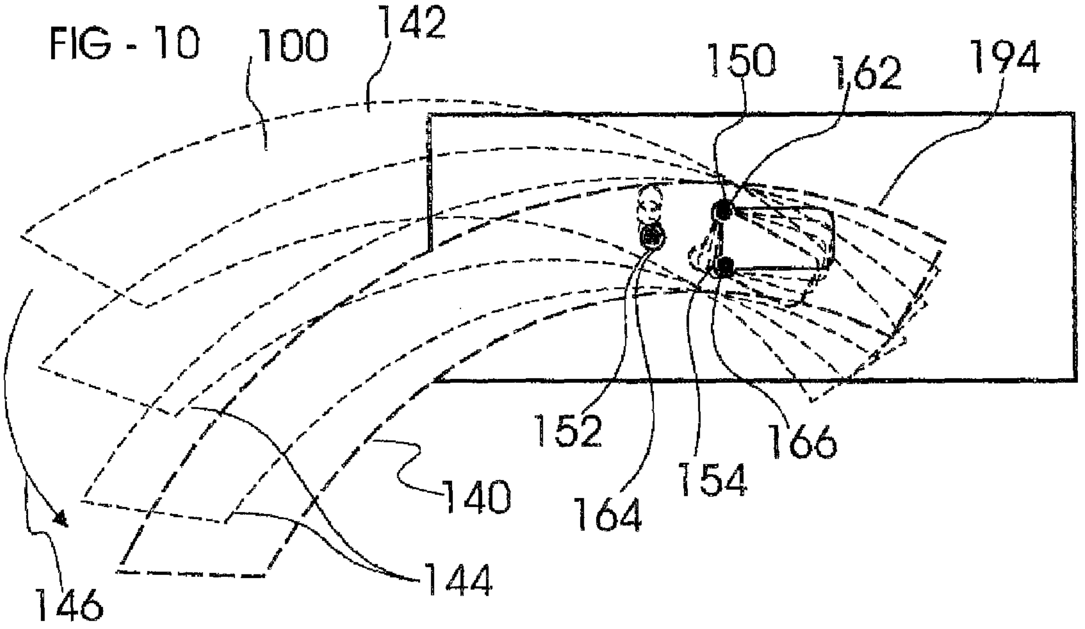
FIG. 10 is a top plan view showing schematically the sequence of steps taken into place a curved section to a fixture.
Figure 11:
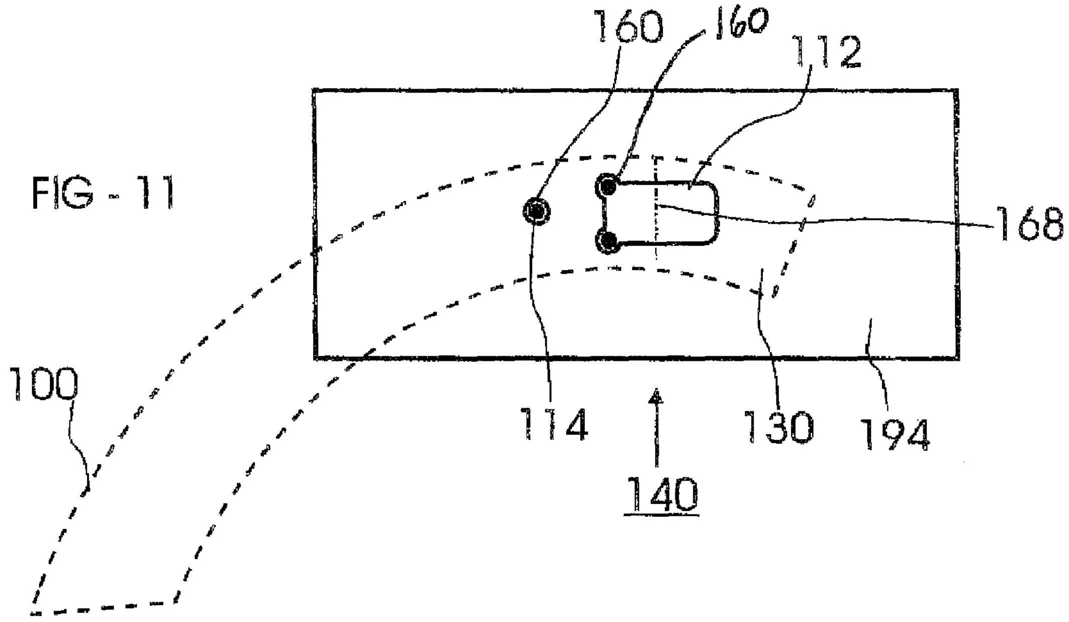
FIG. 11 is a top plan schematic view of a curved section shown in a locked position, wherein the locating pins are seated in the locating holes on fixtures.

FIGS. 10 and 11 show how each curved section 100 is sequentially placed onto a male locating male locating fixture 194 having a number of locating pins 160 placed in a strategic location, such that curved section 100 can be taken from an initial position 142 shown in dashed lines through intermediate position 144 shown in dashed lines to a locked position 140, wherein the locking pins 160 register with each locking hole 114.

The sequence in FIG. 10 can either be carried out manually or with the use of an automated machine. Preferably first locking pin 162 registers with first locking hole 150, thereafter the curved section is rotated about first locking pin 162 along direction of rotation shown as arrow 146. Curved section 100 is rotated through intermediate position 144 until the second locking hole 152 registers with second locking pin 164 and third locking hole 154 registers with third locking pin 166. In the locked position 140 all three locking pins 160 are registered with their respective locking holes 114. Curved section 110 will then lay flat against male locating male locating fixture 194 in the locked position 140 as shown in FIG. 11. The sequence of moving curved section 100 from an initial position to initial position 142 to a locked position 140 may vary, in fact the user may in fact use one of the other locking holes 114 as the first locking hole.

A person skilled in the art will realize that it is not necessary to having three locking pins 160 and three locking holes 114. The system would work with two locking holes 114 and two locking pins 160 provided that the two locking holes and locking pins can rigidly hold the curved section 100 in locked position 140. A person skilled in the art will also know that it is not necessary to have round locating holes 114 and round locating pins 160. For example one could have a locating pocket which could be rectangular, triangular or any other variation of shape, which when the pin engages with the hole or the pocket locks the curved section into position and prevents rotation or movement of the curved section. Therefore it would be possible for example to have a slotted locating hole and a corresponding slot shaped pin which would engage with the slot shaped locating hole. This is just one example of many. The shape or the number of locating pins and locating holes is not critical, other than whatever locating shape one selects it is able to maintain the curved section 100 in a locked position 140, such that a precision cut line 168 is well defined and securely held in position.

Figure 12:
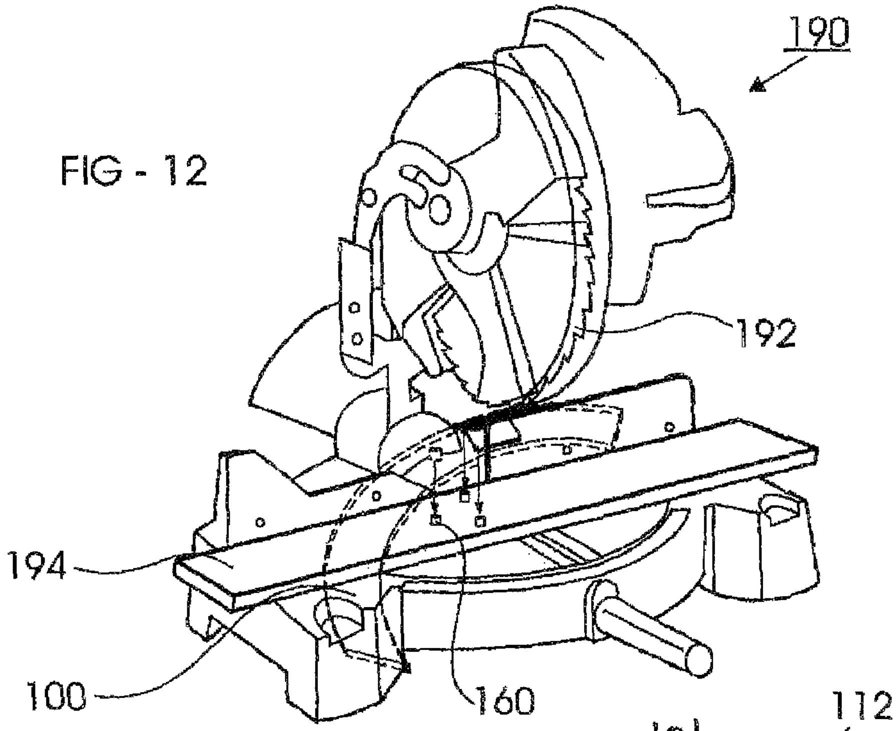
FIG. 12 shows schematically a cut off saw together with the fixture and a curved section, wherein the curved section is cut off by a saw blade at a precision cut line.
Figure 13:
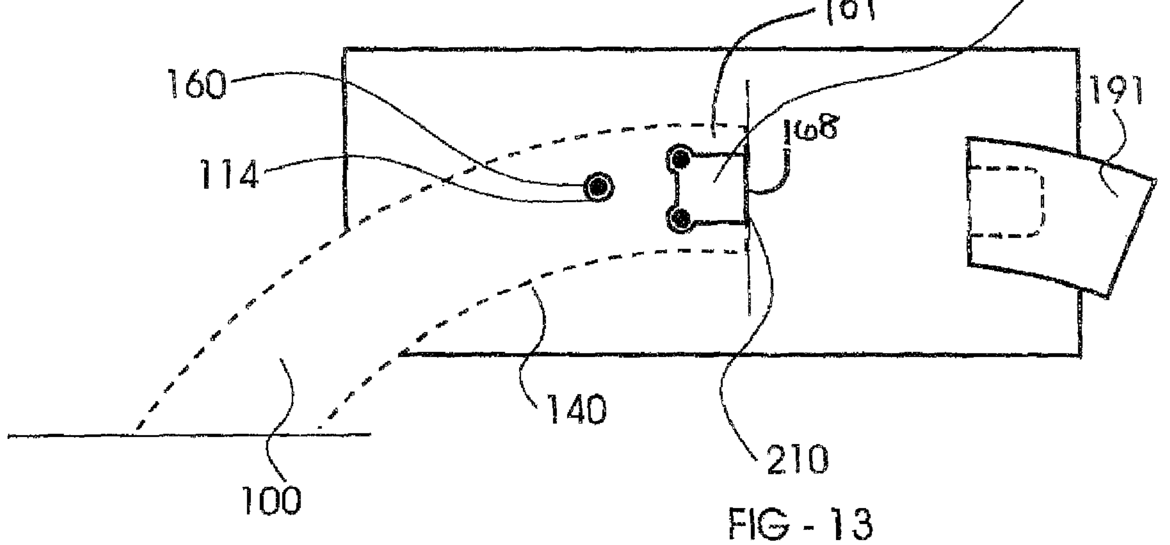
FIG. 13 is a top plan view showing schematically a curved section in a locked position on the fixture after it has been cut in the cut off saw showing the curved section cut at a precision cut end and the waste portion being discarded.

Referring now to FIG. 12 which shows the curved section 100 being positioned onto the male locating fixture 194, such that the locating pins 160 correspond and engage with the locating holes 114, thereby securely positioning and fixturing the curved section 100 into a locked position 140, such that when the saw blade 192 of cut off saw 190 is lowered to cut end 101 of curved section 100, the cut occurs along the precision cut line 168 creating a precision cut end 210, wherein part of end 101 is cut off which is the waste portion 191 which is discarded.

A person skilled in the art will note that the location of precision cut line 168 is determined by the location of the locating holes 114 relative to the curved section 100 by moving the location of locating holes 114, one can vary the position of precision cut line 168 to a pre calculated position.

FIG. 14 shows an end 101 of curved section 100 which also has the optional pocket 112. This pocket is used for installation of a hinge 212, such that when two curved sections as shown in FIG. 16, namely first curved section 220 is butted against second curved section 222, along each precision cut end 210, one is able to join the two curved sections with hinge 212 which is locked into pocket 112 defined in each end 101 of each curved section. The hinge is shown in an unfolded position 251 in FIG. 17 and is moveable between an unfolded position 251 and folded position not shown such that the bottom side 104 of the first curved section 220 and second curved section 222 are adjacent and juxtaposed.

The following is a summary of the steps required for the method of manufacturing multi piece curved moldings from planar material and includes the following steps:

(1) Milling locating holes 114 in the bottom side 104 of sheet material 102 proximate ends 101 of curved sections 100.

(2) Milling curved section 100 from sheet material 102 including the finished outer radius 250, the finished inner radius 252 and milled ends 254.

(3) Milling the profile to produce the profiled top side 132 on curved section 100.

(4) Placing locating holes 114 in corresponding locating pins 160 in a precision cut off male locating fixture 194.

(5) Precision cutting ends 101 of curved section 100 thereby producing a precision cut end 210 and discarding waste portion 191.

In addition to the above steps, optionally a pocket 112 can be milled into a bottom side 104 of sheet material 102 prior to removing curved section 100 from sheet material 102.

Referring now to FIGS. 18 through 25, each of these figures showing alternate embodiments of curved sections and alternate embodiments of locating means which include locating pockets, locating holes and/or locating indents.

Figure 18:
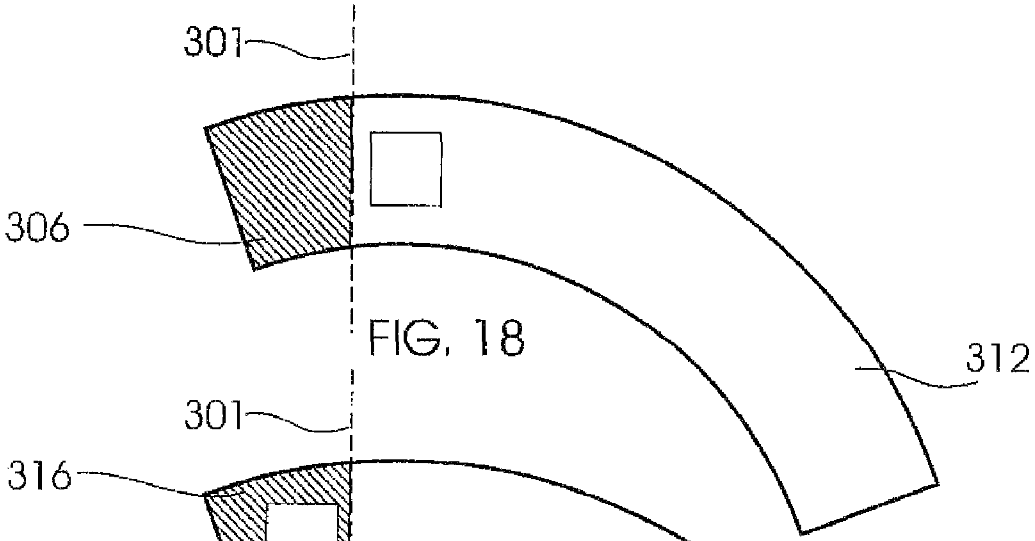
FIG. 18 is a bottom plan view of an alternate embodiment of a curved section.

FIG. 18 shows a curved section 302 having a locating pocket 304, precision cut line 301 and a waste end 306.

Figure 19:
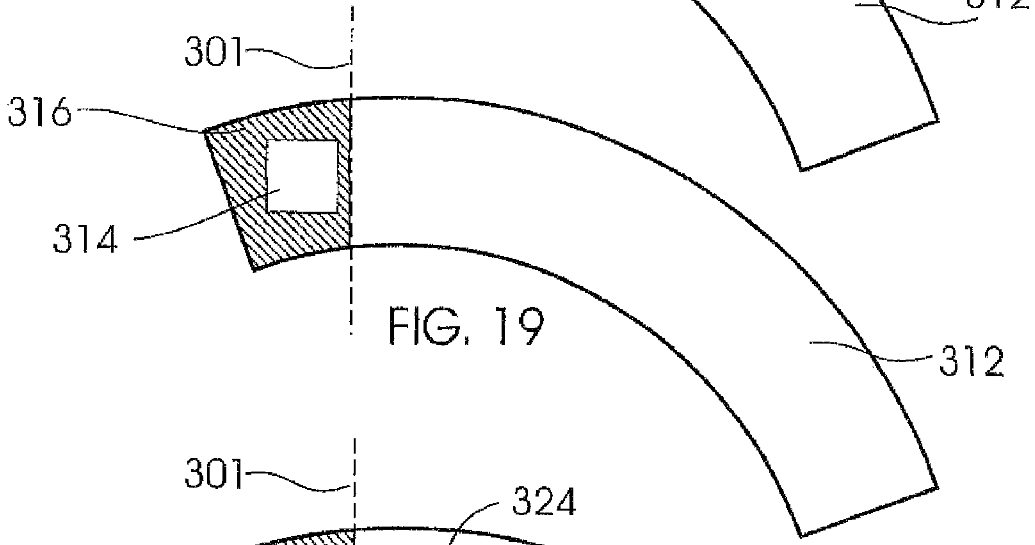
FIG. 19 is a bottom plan view of an alternate embodiment of a curved section.

FIG. 19 shows a curved section 312 having a locating pocket 314 in the waste end 316, rather than in the retained end.

Figure 20:
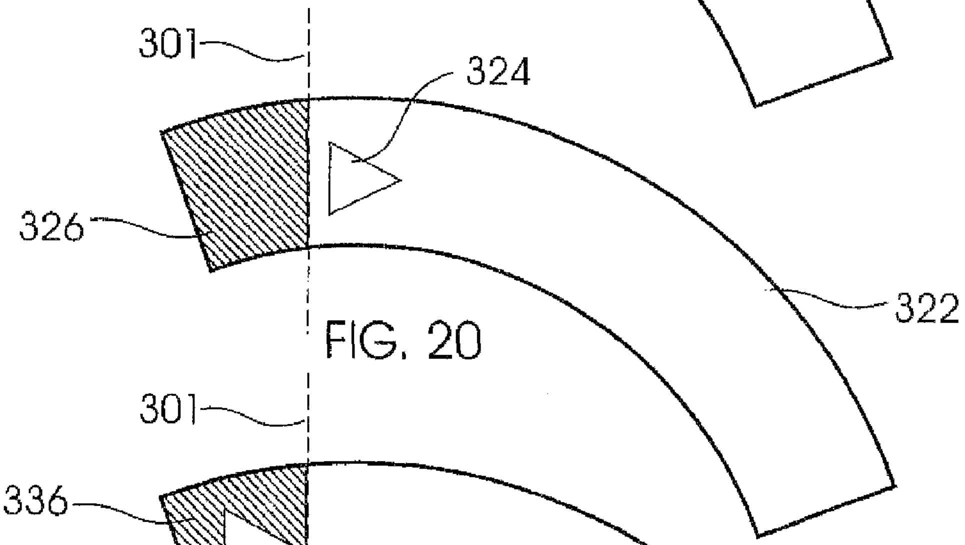
FIG. 20 is a bottom plan view of an alternate embodiment of a curved section.

FIG. 20 shows a curved section 322 having a locating pocket 324 in the retained portion of curved section 322 and a waste end 326.

Figure 21:
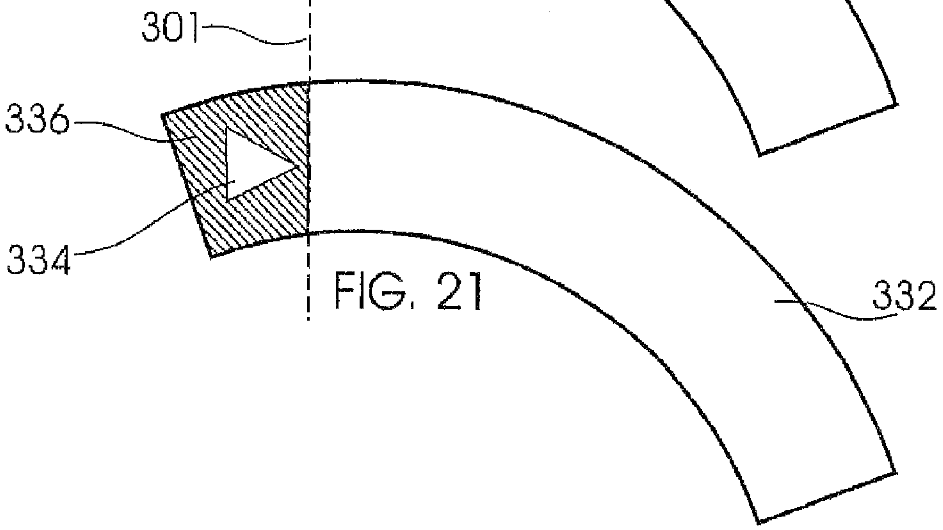
FIG. 21 is a bottom plan view of an alternate embodiment of a curved section.

FIG. 21 shows a curved section 332 having a locating pocket 334, located in waste end 336.

The reader will note that the locating means, namely locating pocket 304, 314, 324 and 334 can take on a variety of shapes as depicted in the figures as well as those not shown in the diagram.

Figure 22:
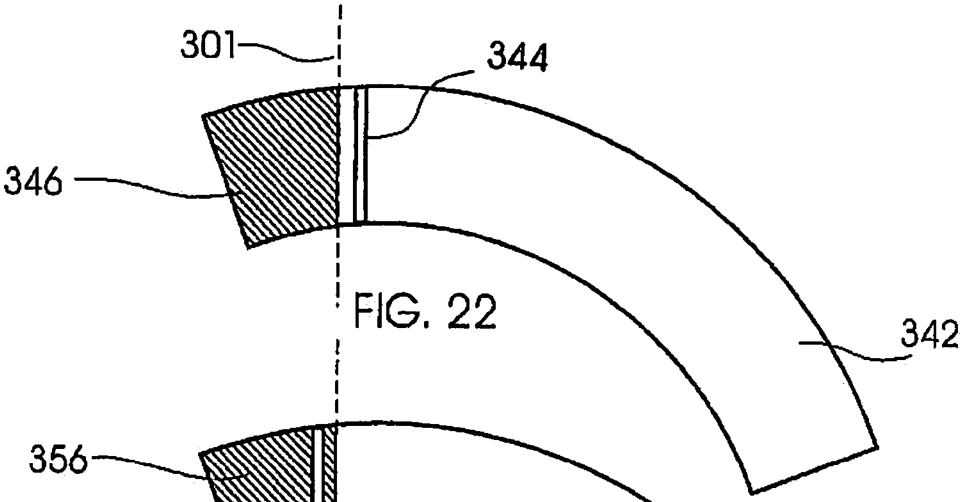
FIG. 22 is a bottom plan view of an alternate embodiment of a curved section.

For example FIG. 22 shows curved section 342 having a locating pocket 344, a waste end 346 and a precision cut line 301.

Figure 23:
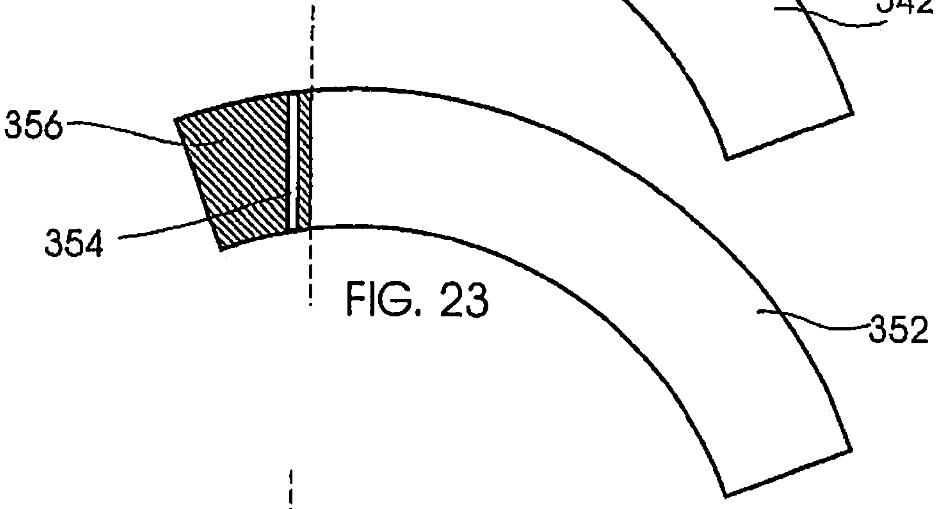
FIG. 23 is a bottom plan view of an alternate embodiment of a curved section.

FIG. 23 shows a curved section 352 having a locating pocket 354 defined in the waste end 356 together with a precision cut line 301.

Figure 24:
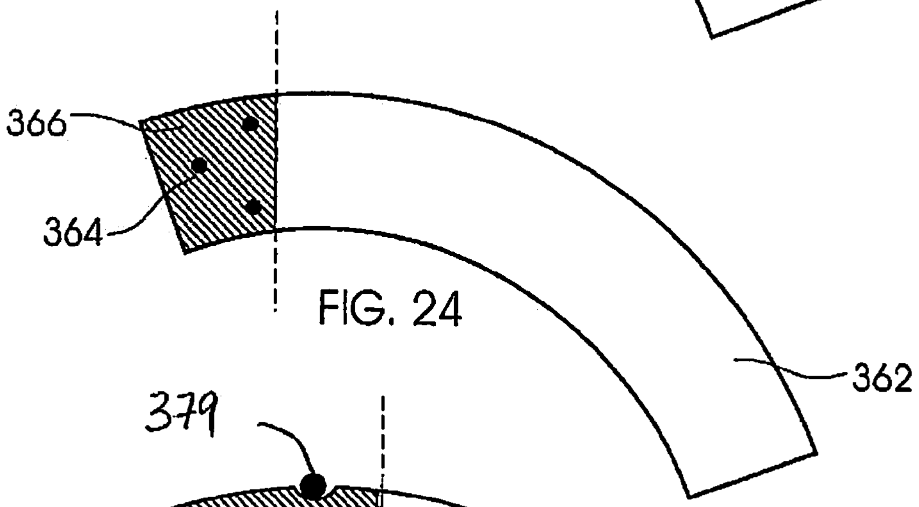
FIG. 24 is a bottom plan view of an alternate embodiment of a curved section.

FIG. 24 shows a curved section 362 having a waste end 366 and locating holes 364 defined within waste end 366.

Figure 25:
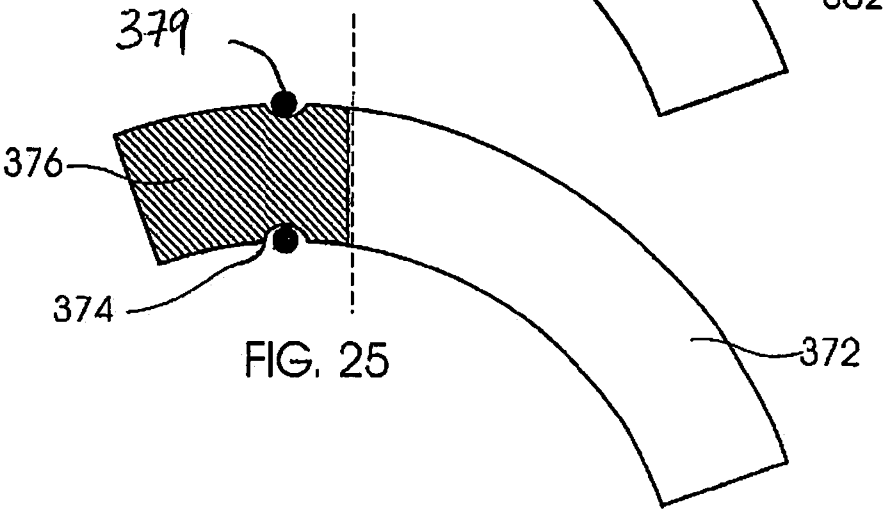
FIG. 25 is an alternate embodiment of a bottom plan view of a curved section together with locating pins.

FIG. 25 is another alternate embodiment of a curved section 372 having a waste end 376 and defined therein locating indents 374. FIG. 25 also shows a couple of locating pins 379.

Figure 26:
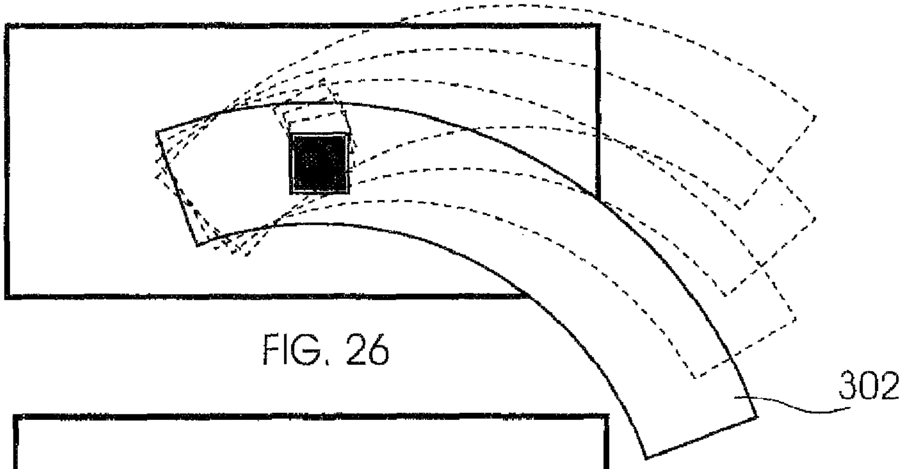
FIG. 26 is a top plan view showing schematically the sequence of steps taken in order to place a curved section onto a fixture having a locating block.
Figure 27:
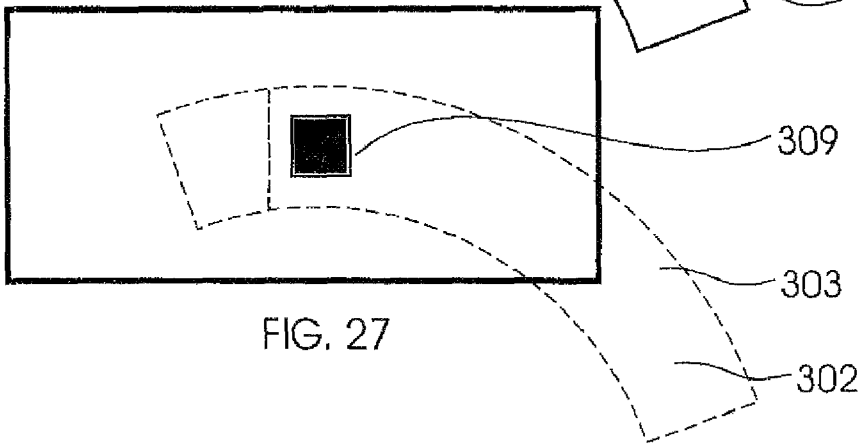
FIG. 27 is a top plan schematic view of a curved section shown in a locked position located on a locating block.

FIGS. 16, 28, 30 and 32 show schematically the steps taken in order to place a curved section for example 302, 322, 342 and 372 respectively onto a fixture having a locating block. For example, FIG. 26 shows the sequence of steps taken in order to place curved section 302 from an unlocked position to a locked position 303 as shown in FIG. 27, wherein locating pocket 304 registered with locating block 309 as shown in FIG. 27. In the locked position shown in FIG. 27, curved section 302 is prepared and ready for precision cutting in a cut off saw 190 shown in FIG. 38.

Figure 28:
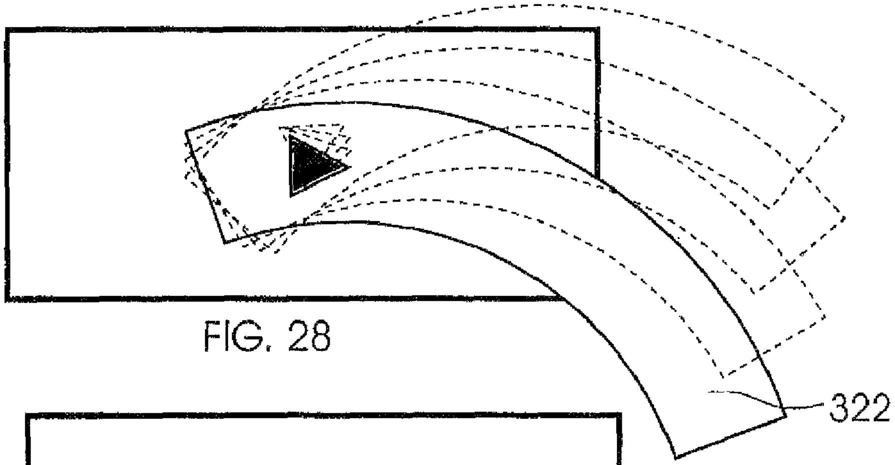
FIG. 28 is a top plan view showing schematically the sequence of steps taken in order to place a curved section onto a locating block located on a fixture.
Figure 29:
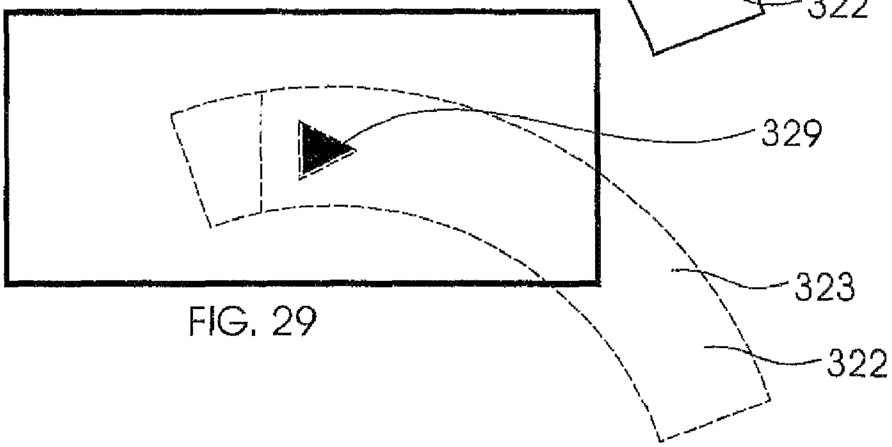
FIG. 29 is a top plan schematic view of a curved section shown in a locked position.
Figure 30:
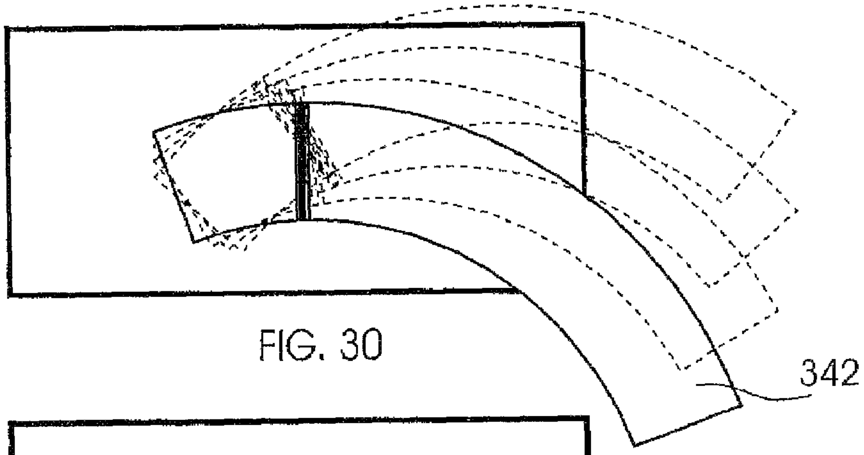
FIG. 30 is a top plan view showing schematically the sequence of steps taken in order to place a curved section onto a fixture.
Figure 31:
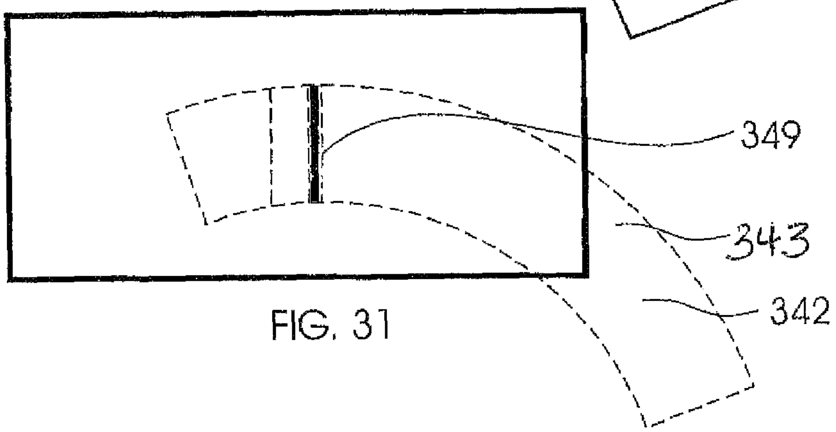
FIG. 31 is a top plan schematic view of a curved section shown in the locked position.
Figure 32:
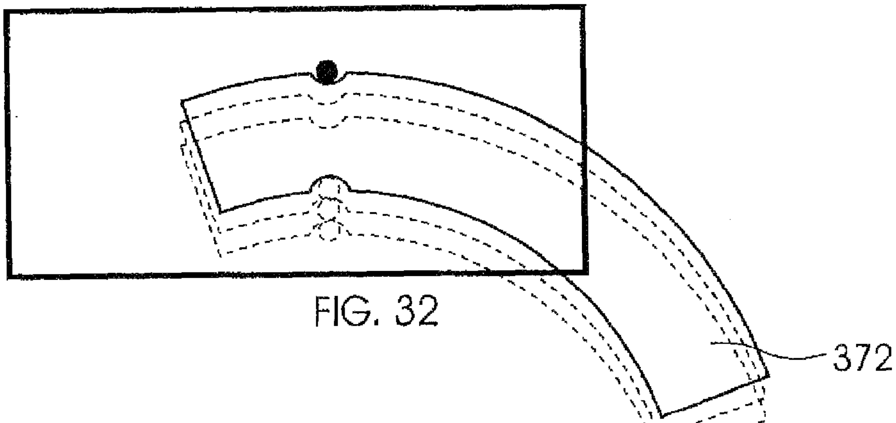
FIG. 32 is a top plan view showing schematically the sequence of steps taken in order to place a curved section onto a fixture.

Similarly in FIGS. 28 and 29, curved section 322 is shown in the locked position 323 locked onto locating block 329. FIGS. 30 and 31 show curved section 342 in the locked position 343 over locating block 349 in FIG. 31.

Figure 33:
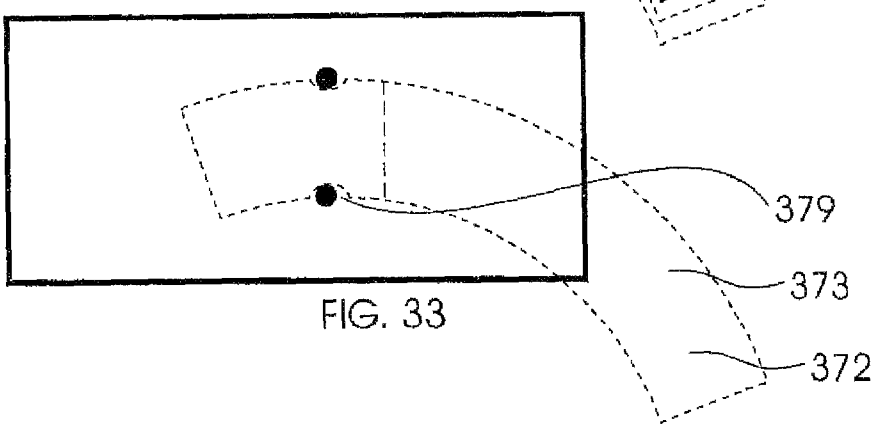
FIG. 33 is a top plan schematic view of a curved section shown in the locked position.

FIG. 33 for example, curved section 372 is shown in the locked position 373, locked by locating pin 379.

Figure 34:
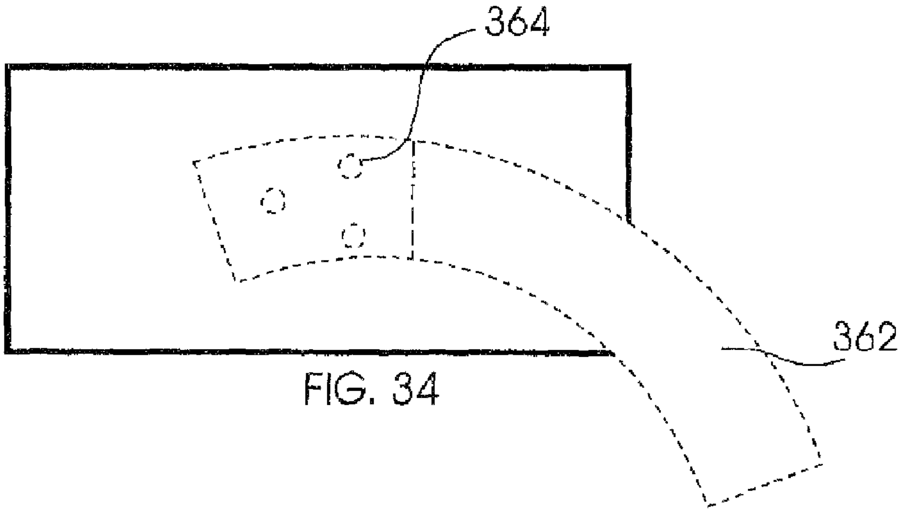
FIG. 34 is a top plan schematic view of a curved section being placed on a fixture.
Figure 35:
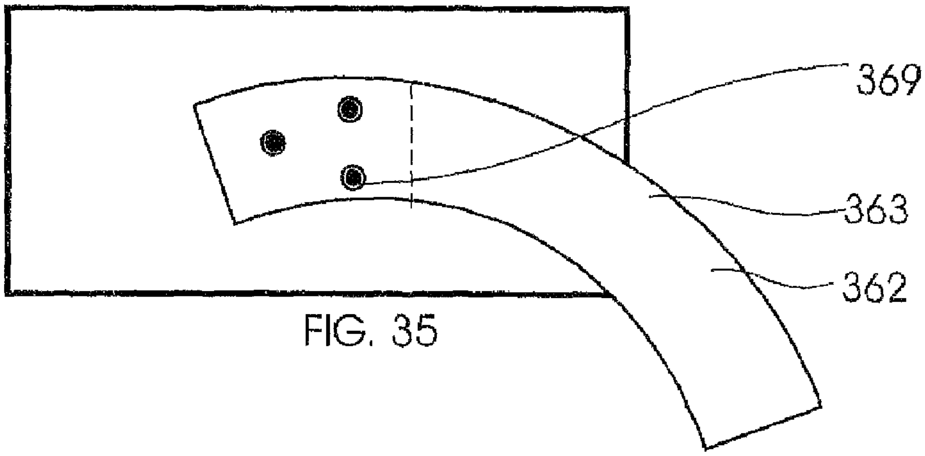
FIG. 35 is a top plan schematic view of a curved section shown in locked position.

In FIGS. 34 and 35 for example, curved section 362 is shown in the locked position 363, wherein locating pins 369 pierced through locating holes 364.

Figure 36:
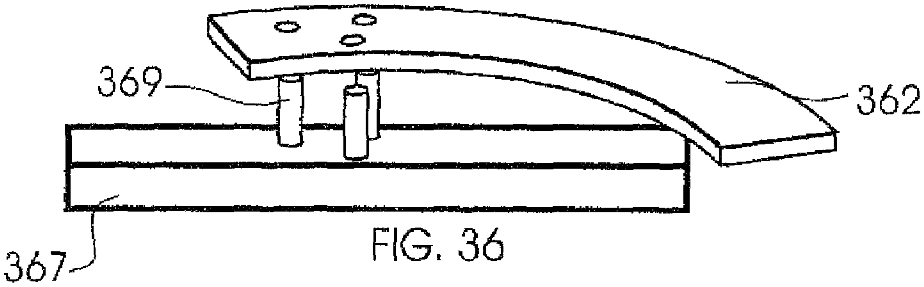
FIG. 36 is a side schematic perspective view of a curved section being placed onto a fixture.
Figure 37:
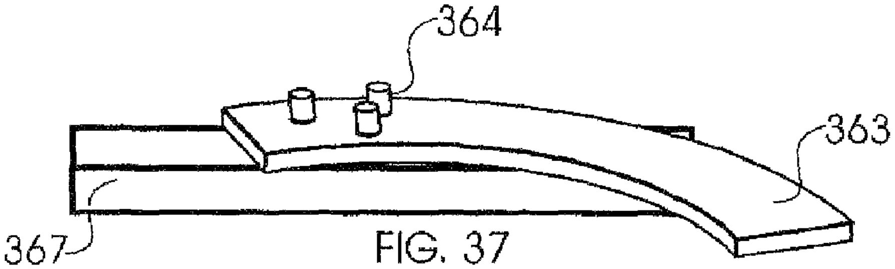
FIG. 37 is a side schematic perspective view of a curved section shown in the locked position on a fixture.

In FIGS. 36 and 37 are schematic side perspective view of FIGS. 34 and 35 respectively. In FIG. 36, curved section 362 is placed over locating pins 369 such that locating holes 364 register with locating pins 369. In FIG. 37, curved section 362 is shown in the locked position 363 on Fixture 367 such that locating pin 369 pierced through locating holes 364.

Figure 38:
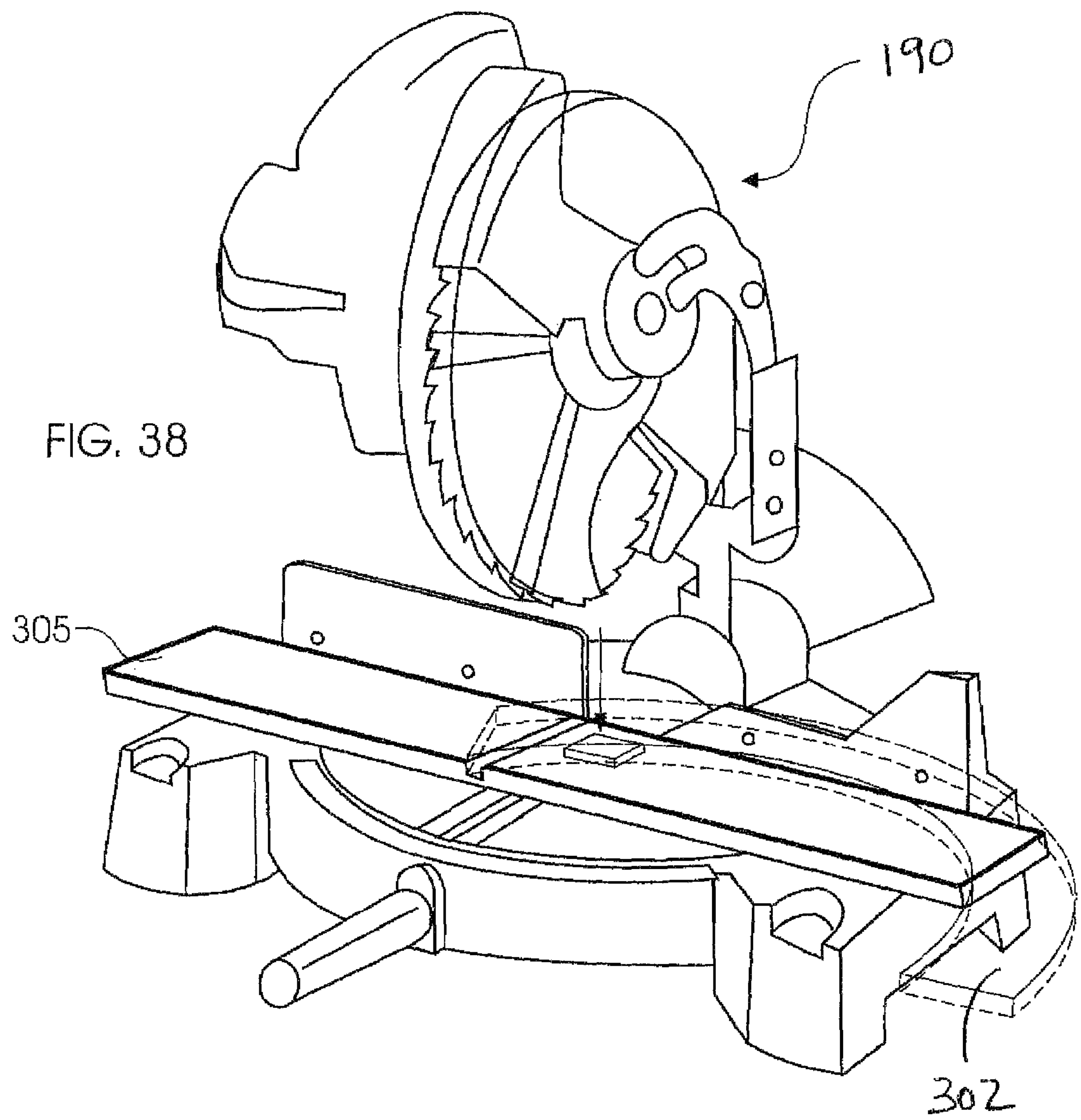
FIG. 38 is a schematic perspective view of a cut off saw together with a fixture and a curved section, wherein the curved section is cut off by a saw blade at a precision cut line.
Figure 39:
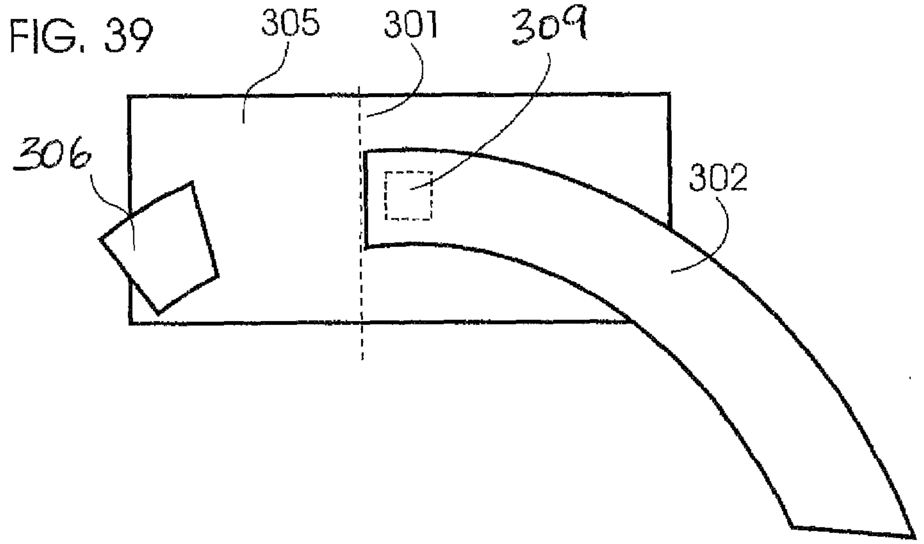
FIG. 39 is a top plan view showing schematically a curved section in a locked position on a fixture after it has been cut off and the cut off saw showing the curved section cut at a precision cut and the waste portion being discarded.

In this manner all of the above depicted and described curved sections can be placed onto a fixture 305 as shown in a fixture similar to fixture 305 as shown in FIG. 38 in order to be cut off. In FIG. 39 the waste end 306 for example is discarded after curved section 302 has been cut along precision cut line 301. A person skilled in the art will recognize that the locating means being any number of pockets, holes, indents and/or other mechanical configurations can be used in order to locate and lock a curved section onto a signature for a further cutting on along precision cut line 301.

I claim:

1. Method of manufacturing multi piece curved sections from planar sheet material including the steps of:

a) milling at least one female locating feature in a bottom side of the planar sheet material;

b) milling at least one curved section from the planar sheet material including a finished outer radius, a finished inner radius and milled ends;

c) placing the at least one curved section onto a male locating fixture such that the at least one female locating feature registers with the male locating fixture to securely position the at least one curved section for subsequent precision cutting; and d) precision cutting at least one of the milled ends of the at least one curved section, thereby producing a precision cut end.

2. The method of manufacturing multi piece curved sections from planar material claimed in claim 1 further including the step of milling a pocket into the bottom side of the at least one curved section adapted to receive a portion of a hinge therein.

3. The method of manufacturing multi piece curved sections from planar material claimed in claim 1 further including the step of milling a profile on a top side thereby producing a profiled top side.

4. The method of manufacturing multi piece curved sections from planar sheet material as set forth in claim 1, wherein the at least one curved section is a molding section.

5. A method of manufacturing multi piece curved sections from planar sheet material including the steps of:

a) milling at least one female locating feature in the planar sheet material;

b) milling at least one curved section from the planar sheet material including a finished outer radius, a finished inner radius and milled ends such that the at least one locating feature is located on the at least one curved section, c) placing the at least one curved section onto a male locating fixture such that the at least one female locating feature registers with the male locating fixture to securely position the at least one curved section for subsequent precision cutting, and d) precision cutting at least one of the milled ends of the at least one curved section, thereby producing a precision cut end.

6. The method of manufacturing multi piece curved sections from planar material claimed in claim 5 wherein the at least one female locating feature includes locating indents defined in the at least one curved section.

7. The method of manufacturing multi piece curved sections from planar material claimed in claim 5 wherein the at least one female locating feature includes a locating block defined in the at least one curved section.

8. The method of manufacturing multi piece curved sections from planar material claimed in claim 5 wherein the at least one female locating feature includes locating holes defined in the at least one curved section.

9. The method of manufacturing multi piece curved sections from planar sheet material as set forth in claim 5, wherein the at least one curved section is a molding section.

* * * * *